United States Patent
Akkaya et al.

(10) Patent No.: US 10,705,214 B2
(45) Date of Patent: Jul. 7, 2020

(54) OPTICAL PROJECTOR HAVING SWITCHABLE LIGHT EMISSION PATTERNS

(71) Applicant: Microsoft Technology Licensing, LLC, Redmond, WA (US)

(72) Inventors: Onur Can Akkaya, Palo Alto, CA (US); Cyrus Bamji, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 34 days.

(21) Appl. No.: 15/650,550

(22) Filed: Jul. 14, 2017

(65) Prior Publication Data

US 2019/0018137 A1    Jan. 17, 2019

(51) Int. Cl.
G02B 9/00 (2006.01)
G02B 9/08 (2006.01)
(Continued)

(52) U.S. Cl.
CPC .............. *G01S 17/10* (2013.01); *G01S 7/481* (2013.01); *G01S 7/4814* (2013.01); *G01S 7/4915* (2013.01); *G01S 17/42* (2013.01); *G01S 17/89* (2013.01); *G02B 26/0808* (2013.01); *G02B 27/0905* (2013.01); *G02B 27/425* (2013.01);
(Continued)

(58) Field of Classification Search
CPC ........ G01S 17/10; G01S 7/4915; G01S 7/481; G01S 17/42; G01S 7/4814; G01S 17/89; H04N 13/128; H04N 5/232; G06T 7/521; G02B 27/4272; G02B 5/0268; G02B 27/425; G02B 27/0905; G02B 26/0808; G02B 27/0944; G02F 1/133504;
(Continued)

(56) References Cited

U.S. PATENT DOCUMENTS 8,565,560 B2   10/2013   Popovich et al.
9,048,633 B2    6/2015   Gronenborn et al.
(Continued)

FOREIGN PATENT DOCUMENTS

EP         1852894 A1     11/2007
JP       2014035920 A      2/2014

OTHER PUBLICATIONS

Izadi, et al., "Going Beyond the Display: A Surface Technology with an Electronically Switchable Diffuser", In Proceedings of the 21st Annual ACM Symposium on User Interface Software and Technology, Oct. 19, 2008, pp. 269-278.
(Continued)

*Primary Examiner* — Alicia M Harrington
(74) *Attorney, Agent, or Firm* — Alleman Hall Creasman & Tuttle LLP (57) ABSTRACT

An optical projector comprises a collimated light source, a pattern generating optical element, and a variable optical element positioned optically between the collimated light source and the pattern generating optical element. The variable optical element is configured to adjust a divergence of a light beam incident on the pattern generating optical element. The pattern generating optical element is configured to emit patterned light when the variable optical element is in a first state, and to emit non-patterned light when the variable optical element is in a second state.

20 Claims, 7 Drawing Sheets

(51) Int. Cl.

| | |
|---|---|
| *G01S 17/10* | (2020.01) |
| *G02B 26/08* | (2006.01) |
| *G02B 27/09* | (2006.01) |
| *G02B 27/42* | (2006.01) |
| *G01S 7/481* | (2006.01) |
| *G01S 17/89* | (2020.01) |
| *H04N 5/232* | (2006.01) |
| *G06T 7/521* | (2017.01) |
| *H04N 13/128* | (2018.01) |
| *G01S 7/4915* | (2020.01) |
| *G01S 17/42* | (2006.01) |
| *G01B 11/25* | (2006.01) |
| *G02F 1/1334* | (2006.01) |
| *G02B 5/02* | (2006.01) |
| *G02F 1/1335* | (2006.01) |

(52) U.S. Cl.
CPC .......... *G02B 27/4272* (2013.01); *G06T 7/521* (2017.01); *H04N 5/232* (2013.01); *H04N 13/128* (2018.05); *G01B 11/25* (2013.01); *G02B 5/0268* (2013.01); *G02F 1/1334* (2013.01); *G02F 1/133504* (2013.01); *G02F 2201/305* (2013.01)

(58) Field of Classification Search
CPC . G02F 1/1334; G02F 2201/305; G01B 11/25; H01S 5/423
See application file for complete search history.

(56) References Cited

U.S. PATENT DOCUMENTS

| | | | |
|---|---|---|---|
| 9,318,877 B2 | 4/2016 | Herschbach et al. | |
| 9,535,537 B2 | 1/2017 | Large et al. | |
| 9,553,423 B2 | 1/2017 | Chen et al. | |
| 2010/0202725 A1* | 8/2010 | Popovich | G02B 27/48 385/10 |
| 2011/0094585 A1* | 4/2011 | Debije | C09K 19/588 136/257 |
| 2014/0111616 A1 | 4/2014 | Blayvas | |
| 2016/0026253 A1 | 1/2016 | Bradski et al. | |
| 2017/0329149 A1* | 11/2017 | Fattal | G02F 1/1334 |

OTHER PUBLICATIONS

"Optical Diffuser / Homogenizer Application notes", https://web.archive.org/web/20151119123852/http:/holoor.co.il/Diffractive_optics_Applications/Application%20notes/Optical%20Diffuser%20application%20notes.pdf, Published on: Sep. 11, 2009, 9 pages.

"International Search Report and Written Opinion Issued in PCT Application No. PCT/US18/034803", dated Aug. 14, 2018, 13 Pages.

Pollard, et al., "Building Cameras for Capturing Document", In International Journal on Document Analysis and Recognition, vol. 7, Issue 2-3, Jul. 1, 2005, 15 Pages.

Sakata, et al., "Switchable Zero-Order Diffraction Filters Using Fine-Pitch Phase Gratings Filled With Liquid Crystals", In Japanese Journal of Applied Physics, Japan Society of Applied Physics, vol. 39, Issue 3B, Mar. 2000, 6 Pages.

\* cited by examiner

OPTICAL PROJECTOR HAVING SWITCHABLE LIGHT EMISSION PATTERNS

BACKGROUND

A time-of-flight (TOF) depth camera projects light pulses into an environment, and captures light reflected off objects within the environment to determine a distance between the depth camera and the objects. TOF depth cameras may emit patterned or non-patterned light for the purposes of depth imaging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One disclosed example provides an optical projector comprising a collimated light source, a pattern generating optical element, and a variable optical element positioned optically between the collimated light source and the pattern generating optical element. The variable optical element is configured to adjust a divergence of a light beam incident on the pattern generating optical element. The pattern generating optical element is configured to emit patterned light when the variable optical element is in a first state, and to emit non-patterned light when the variable optical element is in a second state.

DETAILED DESCRIPTION

Time-of-flight (TOF) depth cameras utilize light pulses (e.g., infrared and/or visible light) projected from the TOF depth camera into an imaging environment. The illuminating light pulses reflect from the various surfaces of objects in the imaging environment and are returned to an image sensor. The TOF depth camera generates distance data for object surfaces by quantifying time-dependent return light information. For example, as light is detected sooner when reflected from an object surface nearer to the image sensor than from an object feature further away, the TOF depth camera can determine distance information about that object's features based on the return light information.

In a TOF depth camera, laser light output is typically transmitted through an optical diffuser to meet system requirements, such as field-of-view (FOV), intensity profile, and optical compliance. In most applications, the required intensity profile is non-patterned and relatively smooth over the entire FOV. However, some applications require spatially patterned light as well as the non-patterned (e.g., uniform) light. To achieve such an optical projection system, the optical output may preferably include relatively high spatial frequency and contrast, a relatively wide field-of-view (FOV) and relatively high switching speeds between patterned and non-patterned light emissions. Further, to be applicable across a variety of TOF platforms, such an optical projection system may preferably be portable, low cost, and backwards compatible. Such an optical projection system may thus be compatible with multi-emitter laser diodes and/or wide emitting apertures, may include sources of patterned light and non-patterned light that are co-located, and may satisfy the cost, size, and weight requirements to be incorporated into a mobile device.

Herein, various examples are disclosed to rapidly switch between projecting patterned and non-patterned light. An actuatable variable optical element may be deposed optically between a light source and a pattern generating optical element. In a first state, the actuatable variable optical element directs collimated light towards the pattern generating optical element, and thus the pattern generating optical element emits patterned light. In a second state, the actuatable variable optical element directs uncollimated light towards the pattern generating optical element, and thus the pattern generating optical element emits non-patterned light.

Figure 1:
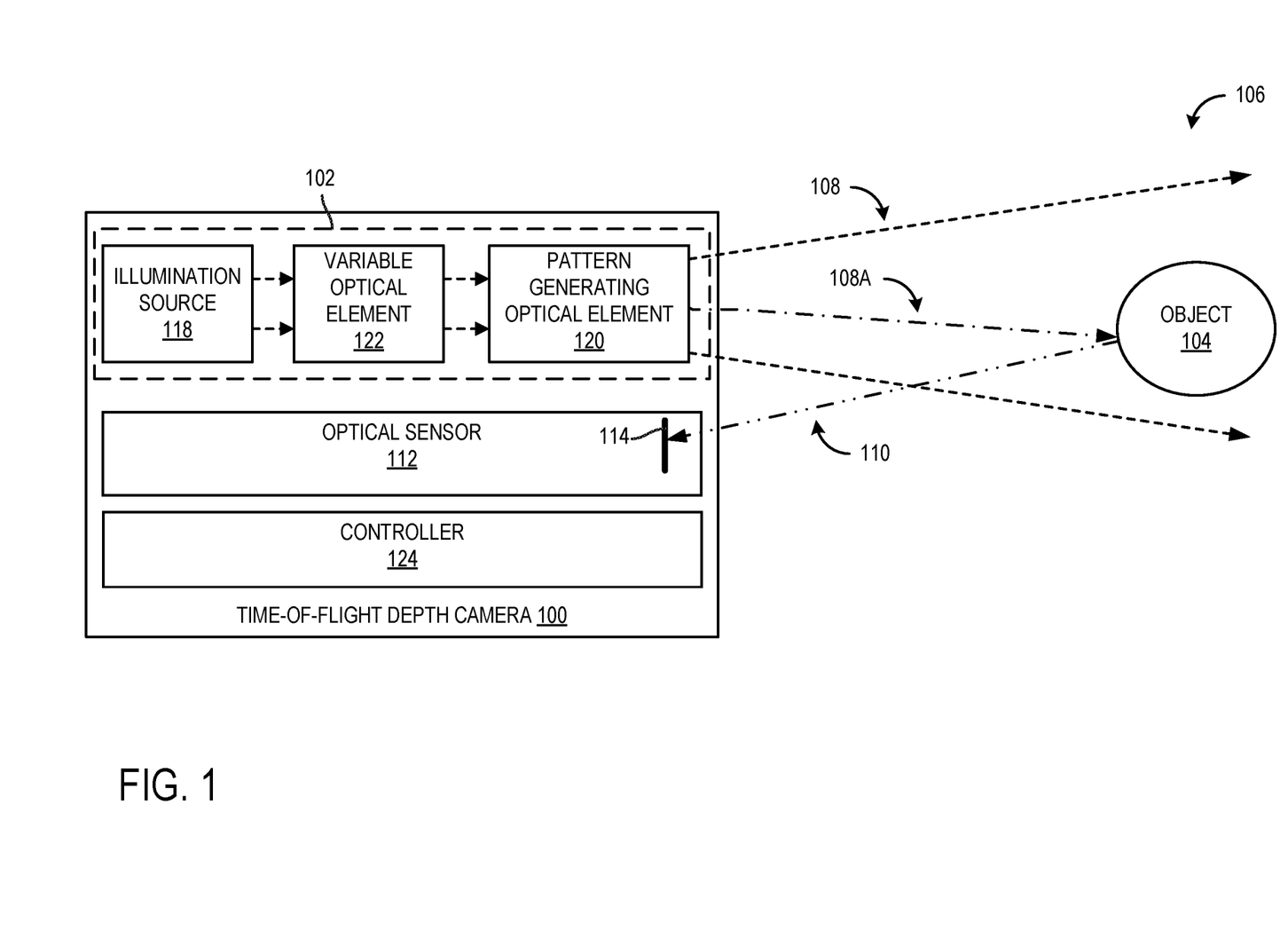
FIG. 1 schematically shows an example time-of-flight depth camera in an example use environment.

FIG. 1 schematically shows an embodiment of a TOF depth camera 100. In the embodiment shown in FIG. 1, TOF depth camera 100 includes an optical projector 102 configured to illuminate a portion of an object 104 positioned in an imaging environment 106 with illumination light 108. For example, a ray of illumination light 108A striking a portion of object 104 is reflected as return light 110. Photons from return light 110 may be collected and used to generate depth information for object 104, as explained in detail below.

While the example shown in FIG. 1 depicts a single optical projector 102 included within TOF depth camera 100, it will be appreciated that a plurality of optical projectors 102 may be included within TOF depth camera 100 to illuminate an image environment.

TOF depth camera 100 further includes an optical sensor 112 configured to detect at least a portion of return light 110 reflected from imaging environment 106. Optical sensor 112 includes a detector 114 for collecting return light 110 for use in generating depth information (e.g., a depth map) for imaging environment 106.

In the embodiment shown in FIG. 1, optical projector 102 includes an illumination source 118 configured to generate collimated light, and a pattern generating optical element 120 configured to shape the collimated light and direct it toward imaging environment 106. A variable optical element 122 is shown positioned optically between illumination source 118 and pattern generating optical element 120.

Illumination source 118 may be a collimated light source, and thus may emit collimated light at any suitable wavelength(s), including but not limited to infrared and visible wavelengths. In some examples, illumination source 118 may include one or more light producing elements as well as a collimator positioned optically between the light producing elements and variable optical element 122.

In some embodiments, illumination source 118 may include one or more individual light producing elements arranged in a light cluster. As used herein, a light cluster refers to an arrangement or grouping of a plurality of light emitters configured to emit light. In some embodiments, the plurality of light emitters may be included in a common housing. Such light clusters may have any suitable shape, and may include any suitable number of light emitters. In some of such embodiments, illumination source 118 may include a linearly-shaped light bar having a plurality of light emitters arranged in parallel (e.g., an extended source laser).

Pattern generating optical element 120 may include one or more spatial light modulators (SLM), diffractive optical elements (DOE), and/or amplitude masks (AM). The type of pattern generating optical element 120 may be selected based at least in part on one or more characteristics of illumination source 118. Examples of pattern generating optical elements are described herein and with regard to FIGS. 2, 4, 5A-5B, and 6A-6B, but it should be understood that any suitable pattern generating optical element may be utilized without departing from the scope of this disclosure.

In some examples, pattern generating optical element 120 may generate line patterns, although other light patterns may be generated. Many TOF lasers utilize a predominantly rectangular aspect ratio, such as extended source lasers and multi-stripe lasers. For example, lasers with high peak power (e.g., having one large stripe rather than multiple stripes) may have an aperture on the order of 3-4 µm high and 200 µm wide. When such an extended source is collimated, a set of collimated (planar) wavefronts is generated at an array of slightly different angles. Each of these angles then leads to slightly shifted form of the pattern at the output, which may lead to reduction/loss of pattern contrast. For such lasers, it may thus be easier to generate lines via pattern generating optical element 120 than any other pattern, for example, by aligning the laser aperture such that the extended direction is parallel and contributes to the length of the pattern features (e.g., lines) rather than the width of such features. However, different laser configurations may be paired with different suitable pattern generating optical elements. For example, dot patterns may be more suitable for use with VCSEL arrays.

TOF depth camera 100 may further include a controller 124. Controller 124 may be configured with suitable instructions to operate illumination source 118, to actuate variable optical element 122, and to interpret illumination information detected by optical sensor 112. Functions performed by controller 124 may be integrated and/or distributed throughout TOF depth camera 100 and/or a computing device communicatively coupled to TOF depth camera. An example computing device is described herein with regard to FIG. 7.

Many TOF applications rely on the use of non-patterned light sources. In one example, the default output of optical projector 102 may be a patterned image. The pattern may then be diffused, blurred, or otherwise destroyed to generate a non-patterned output image. Variable optical element 122 may be configured to adjust the divergence of a light beam incident on pattern generating optical element 120, such that pattern generating optical element 120 emits patterned light when variable optical element 122 is in a first state, and emits non-patterned light when variable optical element 122 is in a second state. Pattern generating optical element 120 may only emit patterned light when collimated light is incident on a first side of pattern generating optical element 120. As such, in the first state, variable optical element 122 may emit collimated light, while in the second state, variable optical element 122 may emit uncollimated light.

In some examples, patterned light may be generated even if uncollimated light is incident on pattern generating optical element 120, provided that each of the diffraction orders exiting pattern generating optical element 120 are collimated prior to exiting TOF depth camera 100. For example, light exiting pattern generating optical element 120 may be collimated by one or more additional optical elements downstream of pattern generating optical element 120.

TOF depth cameras typically function to take multiple pictures of a target using multiple phase settings and frequency settings, then combine the pictures together to derive distance. Typically, this is accomplished using non-patterned illumination. By emitting non-patterned light as one of two or more output patterns, optical projector 102 may be backward compatible with other TOF depth cameras that only utilize non-patterned light. Such installations could be achieved without installing algorithms for generating patterned light, provided the default (e.g., non-energized) state of variable optical element 122 is one that produces non-patterned illumination. Additionally or alternatively, such TOF depth cameras could be reprogrammed to generate additional target pictures using patterned light.

Figure 2A:
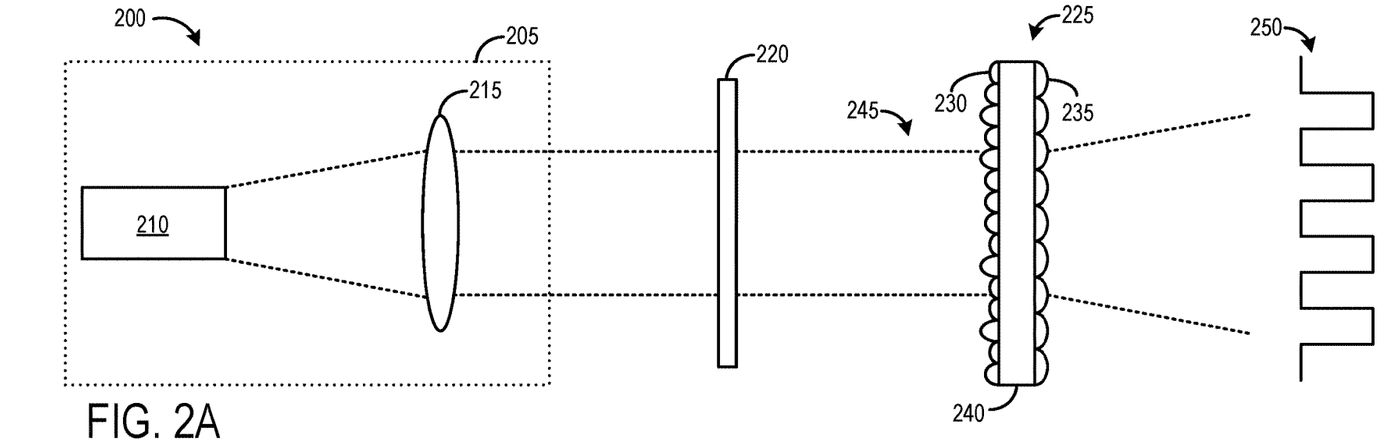
FIGS. 2A and 2B schematically show an example optical projector including a switchable diffuser.
Figure 2B:
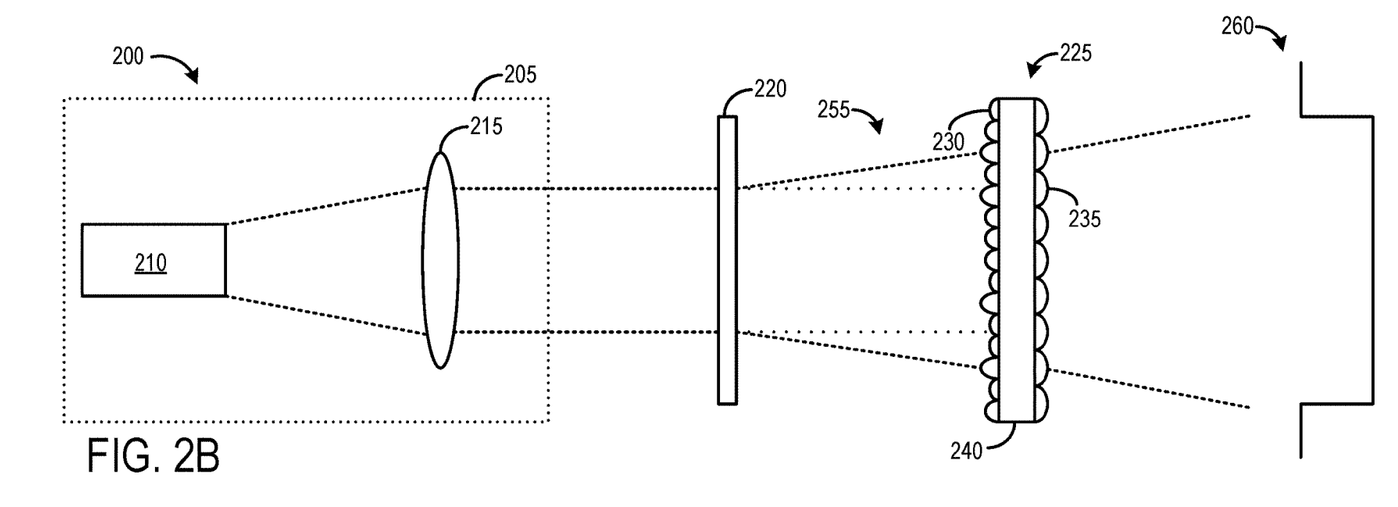

FIGS. 2A and 2B schematically show an example optical projector 200. Optical projector 200 may be an example of optical projector 102. Optical projector 200 includes collimated light source 205, which may be an example of illumination source 118. Collimated light source 205 includes one or more illumination sources 210 and collimator 215. Illumination source 210 may be any suitable light producing element, such as a laser diode. Illumination source 210 may emit uncollimated or semi-collimated light towards collimator 215, which may then emit collimated light and/or substantially collimated light.

Optical projector 200 further includes switchable diffuser 220 and pattern generating optical element 225. Switchable diffuser 220 may be an example of variable optical element 122, while pattern generating optical element 225 may be an example of pattern generating optical element 120. Pattern generating optical element 225 may be configured to generate patterned light (e.g., a line array) during some conditions (e.g., when collimated light is incident on pattern generating optical element 225) and to generate non-patterned light during other conditions (e.g., when uncollimated light is incident on pattern generating optical element 225). Switchable diffuser 220 may be configured to selectively adjust the divergence of light output by collimated light source 205, and thus selectively adjust the output of optical projector 200 between patterned and non-patterned light.

Pattern generating optical element 225 is shown configured as a double-sided pattern generator and includes a non-periodic light shaping element 230 on a first side, a periodic grating 235 on a second side, opposite the first side, and a substrate 240 situated between non-periodic light shaping element 230 and periodic grating 235. In other examples, a pattern generating optical element may have a different configuration.

Non-periodic light shaping element 230 may generate a singular line of light, while periodic grating 235 may split that singular line of light into multiple diffraction orders to generate a line array. Periodic grating 235 may thus be a diffractive grating that outputs light similarly to a microlens array based refractive grating. Periodic grating 235 may include features with a pitch selected to achieve a desired spatial frequency of output light for a given input light wavelength. The depth and shape of periodic grating 235 may further be selected to reduce or eliminate the zero-order exhibited by wide-angle diffractive-optical-elements (DOE) while providing a high pattern contrast, thus facilitating eye safety for a user.

Pattern generating optical element 225 may thus require a certain degree of collimation at its first (light-input) side to resolve the spatial frequency of the output pattern. This spatial frequency, or the angular resolution of the output pattern, is a function of the grating period and the wavelength of the input light. To resolve the output pattern, the degree of collimation should be smaller than the angular resolution of the diffuser. This may be achieved by placing collimator 215 optically between illumination source 210 and pattern generating optical element 225.

Switchable diffuser 220, placed optically between collimator 215 and pattern generating optical element 225, may thus be configured to vary the degree of collimation of light that is incident on pattern generating optical element 225, thus creating a switchable projector. As shown in FIG. 2A, during a first condition, collimated light is directed through switchable diffuser 220 such that collimated light 245 exits switchable diffuser 220 so as to be incident on pattern generating optical element 225. In this conformation, patterned light 250 is emitted from pattern generating optical element 225. In contrast, as shown in FIG. 2B, during a second condition, collimated light is directed through switchable diffuser 220 such that uncollimated light 255 exits switchable diffuser 220 so as to be incident on pattern generating optical element 225. In this conformation, non-patterned light 260 is emitted from pattern generating optical element 225. In the second condition, switchable diffuser 220 diffuses the collimated input light so that the uncollimated light exiting switchable diffuser 220 is more diffuse than the angular resolution of pattern generating optical element 225.

Pattern generating optical element 225 creates both a line array and a light intensity profile. The overall output light intensity distribution may be unpatterned, parabolic (e.g., as shown at 260), batwing shaped, etc. The envelope of the non-patterned light intensity may have a smooth profile, but may not necessarily be flat or uniform. The output light intensity may be greater in the edges than in the center. Pattern generating optical element 225 may be configured such that more light is directed to regions of the imaging environment where illumination is more important, or according to any desired profile. For example, a backwards compatible optical projector may mimic the light intensity profile of the retrofitted device. Once the intensity envelope is designed, it is generated for both the patterned and non-patterned emissions. Switching of switchable diffuser 220 from a first state to a second state allows for preservation of the output light intensity envelope.

Many pattern projectors achieve patterned light output by removing light. In contrast, in the example shown in FIGS. 2A and 2B, substantially all the light emitted by collimated light source 205 is output by pattern generating optical element 225. The light that would otherwise be absorbed to create dark pattern regions is instead guided into the light pattern regions. This provides a more efficient switchable pattern that can be achieved with a relatively small footprint. Further, it is also possible to configure an optical projection system with multiple illumination sources and pattern generating optical elements, positioned to generate orthogonal patterns (e.g. orthogonal line arrays) without challenging alignment requirements.

Although depicted with switchable diffuser 220 optically between collimator 215 and pattern generating optical element 225, in other configurations, a variable element may be deposed optically between illumination source 210 and collimator 215. For example, a tunable optical element may be positioned to virtually adjust a position of illumination source 210 relative to collimator 215. For example, in a first state, light emitted by illumination source 210 may be focused by collimator 215, so as to generate collimated light emitted from collimator 215. In a second state, light emitted by illumination source 210 may not be collimated by collimator 215, so as to generate uncollimated light emitted from collimator 215.

Figure 3:
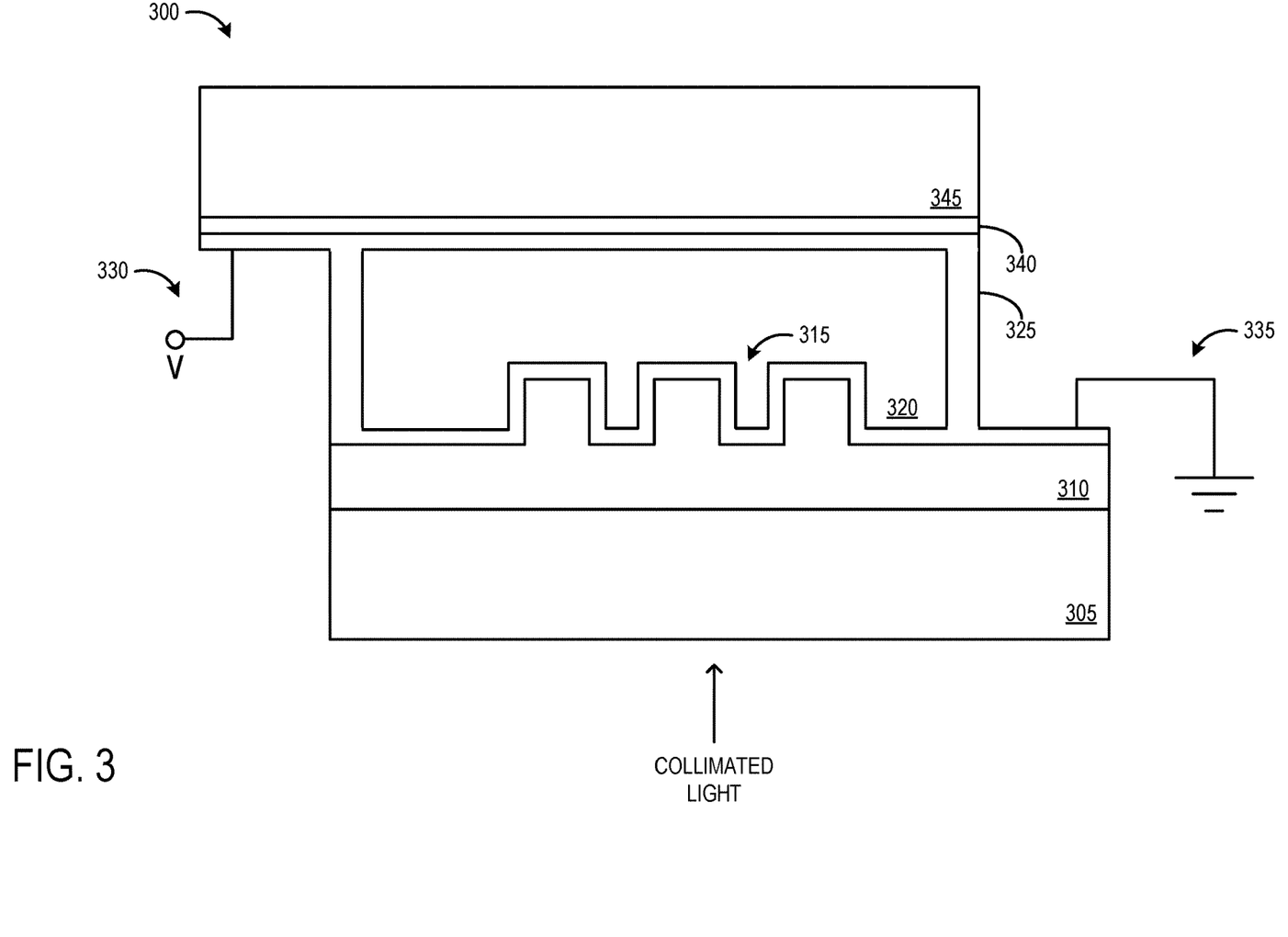
FIG. 3 schematically shows an example liquid crystal based switchable diffuser.

As an example, an electrically controllable switchable diffuser may be generated by encapsulating a light shaping element (e.g., a diffractive optical element, or DOE) in a liquid crystal cell. FIG. 3 schematically shows an example liquid crystal based switchable diffuser 300. Liquid crystal based switchable diffuser 300 includes a first substrate 305, which may be an optical transparent substrate (e.g., quartz). A diffractive element 310 is deposed on a surface of first substrate 305. Diffractive element 310 includes a diffractive grating 315, which is shown encapsulated in liquid crystal layer 320. As an example, diffractive element 310 may be a narrow-angle diffuser.

A voltage carrier layer 325 may surround liquid crystal layer 320. As such, diffractive grating 315 may be surrounded by voltage carrier layer 325. Voltage carrier layer 325 may be an optically transparent conductive layer, such as an ITO layer. Voltage carrier layer 325 may be coupled to a voltage source 330 and a ground terminal 335. Voltage source 330 may be electrically coupled to a controller and thus configured to selectively apply a voltage to liquid crystal layer 320, which may include a plurality of liquid crystal molecules (LCs).

An alignment layer 340 may be positioned on one side of liquid crystal layer 320 (opposite from diffractive element 310). A second substrate 345 may be positioned on a side of alignment layer 340, opposite from liquid crystal layer 320. Similar to first substrate 305, second substrate 345 may be an optically transparent substrate (e.g., quartz).

LCs are optically anisotropic materials having a refractive index that is a function of the polarization and propagation direction of light. Light that is polarized along the molecular long axis of the LC propagates slower, corresponding to a higher refractive index (extraordinary refractive index: $n_e$). Similarly, light that is polarized perpendicular to the molecular axis of the LC propagates faster corresponding to a lower refractive index (ordinary refractive index: $n_o$). Associated refractive index difference is defined by the birefringence: $\Delta n = n_e - n_o$. By applying an electric field across liquid crystal layer 320, it is possible to change the molecular axis of the LCs there within, and thus adjust the refractive index experienced by the incident light.

The electrically controllable refractive index of LCs enables the functionality of liquid crystal based switchable diffuser 300. In order to generate a light pattern from the diffractive element, there needs to be a refractive index contrast between the substrate material and the surrounding medium. In general, such devices are open-air, so there is a difference between the substrate and air. Here, diffractive element 310 is encapsulated in liquid crystal layer 320. Adjusting a voltage applied to liquid crystal layer 320 changes the refractive index of the LCs. If the LCs are biased so the refractive index of the LC and polymer are the same, the light does not interact with the diffractive topology, and passes through as if it were a glass plate. When the LCs are biased so there is an index contrast, then the light diffracts on the diffractive grating.

In a first state of the LCs, the refractive index of liquid crystal layer 320 differs from the refractive index of diffractive element 310. This index contrast between diffractive element 310 and its surrounding medium (liquid crystal layer 320) enables the diffraction of the light waves incident on diffractive element 310.

In a second state of the LCs, the refractive index of the liquid crystal layer substantially matches to that of diffractive element 310. In this state, light does not experience any substantial index change while traversing the diffractive element 310, making the liquid crystal based switchable diffuser 300 effectively a uniform layer.

Diffractive element 310 may be a suitable optically transparent material with a known refractive index, such as polymer or quartz. For example, most polymers have an index in the range of 1.5, while LCs have an index between 1.5 and 1.7/1.8. The ordinary refractive index (~1.5) for the LCs can be matched to a polymer, such that the index of liquid crystal layer 320 matches the index of diffractive element 310 when a voltage is applied to the liquid crystals. When no voltage is applied to liquid crystal layer 320, the LCs assume the extraordinary refractive index (~1.7-1.8), which is greater than the refractive index of diffractive element 310.

However, it should be noted that in some examples, liquid crystal layer 320 may have a refractive index that differs from that of diffractive element 310 when a voltage is applied to liquid crystal layer 320 (e.g., the ordinary refractive index), and has a refractive index that matches that of diffractive element 310 when no voltage is applied (e.g., the extraordinary refractive index). For example, a polymer may be selected with a relatively high refractive index (~1.7-1.8). As such, light may diffract when a voltage is applied to liquid crystal layer 320, and may not diffract when no voltage is applied. In either configuration, the refractive index of liquid crystal layer 320 may change over a duration on the order of 1-10 milliseconds, based on factors such as the LC gap size and LC materials. This rapid switching enables different illumination conditions to be provided within a single frame of a TOF depth camera.

Although described with regard to liquid crystals, liquid crystal based switchable diffuser 300 may additionally or alternatively employ polymer-dispersed-liquid-crystals (PDLCs) to enable voltage controlled scattering of light into a desired range of angles. Although described with light entering first substrate 305, and thus light entering diffractive element 310 prior to entering liquid crystal layer 320, the orientation of liquid crystal based switchable diffuser 300 may alternatively be reversed, such that light initially enters second substrate 345, thus entering liquid crystal layer 320 prior to entering diffractive element 310.

Figure 4:
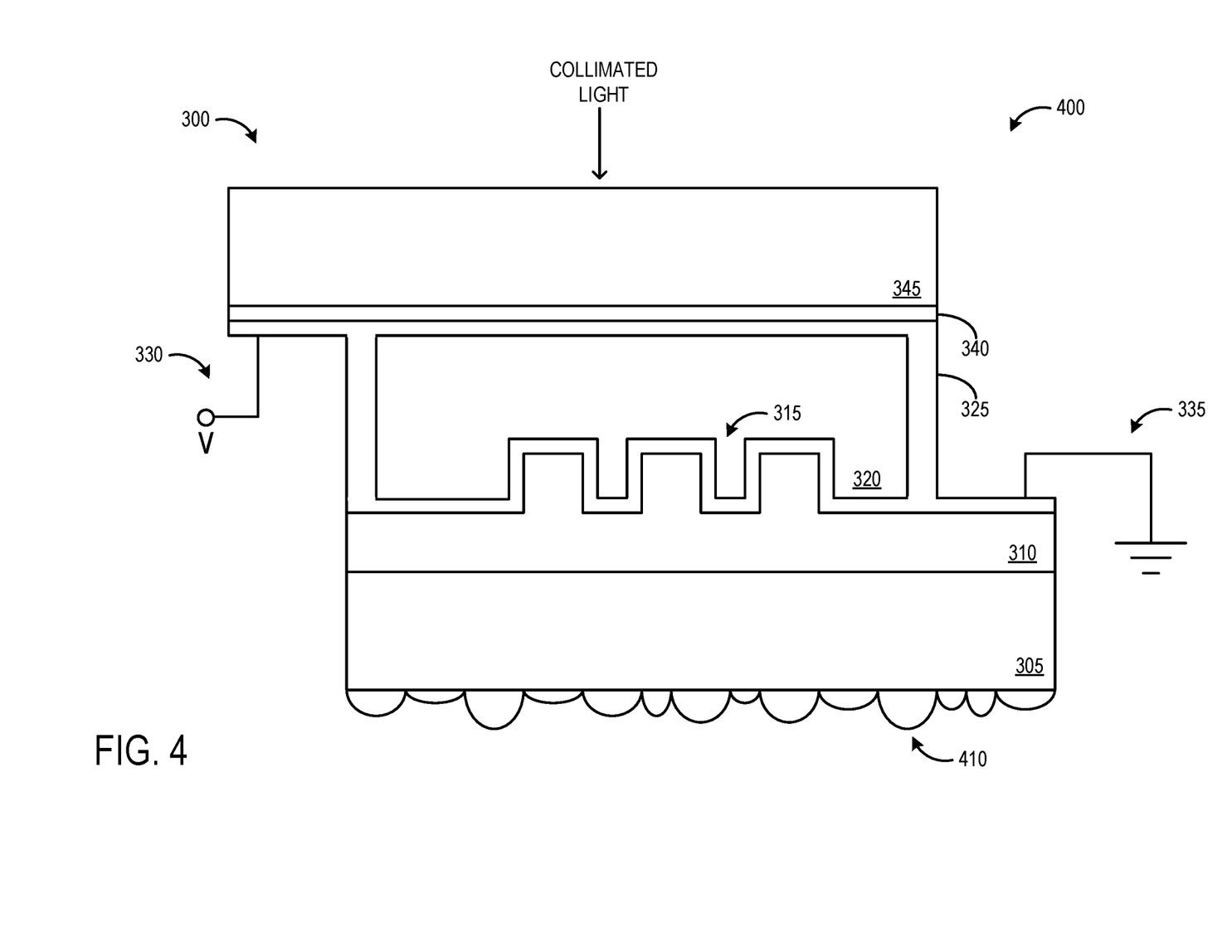
FIG. 4 schematically shows an example single element switchable pattern projector.

Referring to FIG. 1, in some examples, variable optical element 122 and pattern generating optical element 120 may be combined into a single element. FIG. 4 schematically shows an example single element switchable pattern projector 400. Single element switchable pattern projector 400 includes liquid crystal based switchable diffuser 300. Single-sided pattern generator 410 is positioned on a face of first substrate 305, opposite diffractive element 310. In this example, collimated light enters via second substrate 345, traversing liquid crystal layer 320 and diffractive element 310, then passing through first substrate 305 prior to reaching single-sided pattern generator 410.

Single-sided pattern generator 410 may achieve the functionality of a double-sided pattern generator, such as pattern generating optical element 225. Single-sided pattern generator 410 may comprise elements of both non-periodic light shaping element 230 and periodic grating 235. Single-sided pattern generator 410 may be a substantially diffractive optical element configured to both generate one or more lines of light from collimated input light, and to diffractively replicate the lines of light via a diffractive grating. The spatial output pattern may be selected to be in line with the geometry of laser's emitting area. This enables the use of lasers with large emitting areas (extended sources), such as multi-emitter lasers.

The diffractive grating of single-sided pattern generator 410 may mimic or be formed from a microlens array, and thus may have a relatively low manufacturing cost, be minimally dispersive, provide a high pattern contrast, and cause negligible zero order. Such a single-sided pattern generator implementation may further provide a more compact diffusing element with reduced size and weight when compared to a double-sided pattern generator or other diffractive elements.

Using single-sided pattern generator 410, the envelope of the output light intensity profile can be generated as required based on the depth and shape of the structures in each period of the grating. As such, the distribution of energy may be varied among various diffraction orders and the output intensity profile generated to be in line with the geometry of the emitting area of the collimated light source. This may enable the use of extended source lasers, and other lasers with large emitting areas, such as multi-emitter lasers.

Alternatively, an optical projector switchable between patterned light emission and non-patterned light emission may be achieved utilizing one or more tunable focus lenses. Similar to the switchable diffusers described herein, an actuatable lens may be configured to adjust the collimation of light incident on a pattern generating optical element.

Figure 5A:
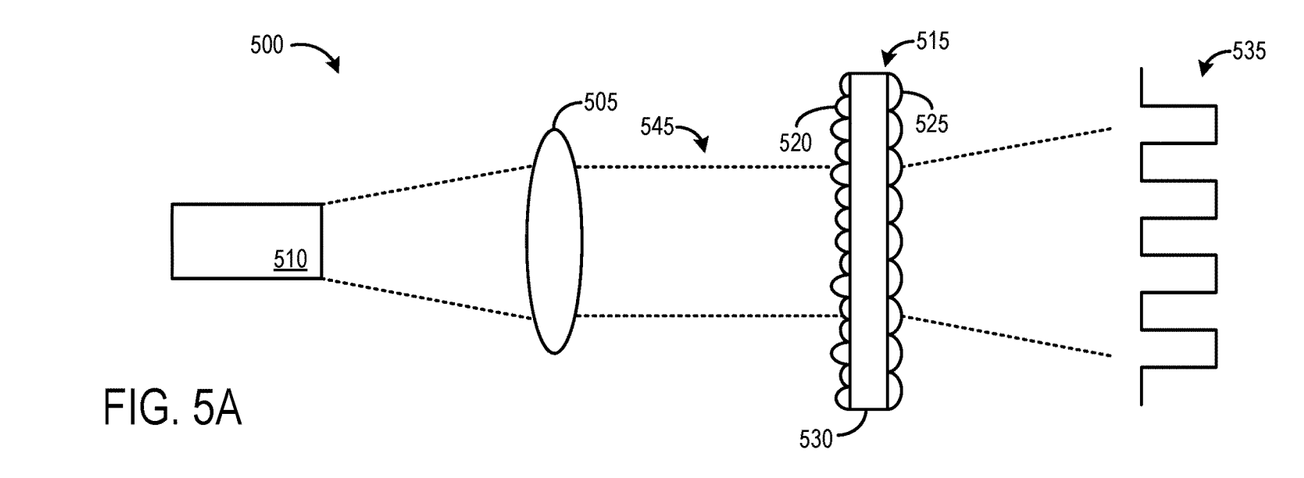
FIGS. 5A and 5B schematically show an example optical projector including a tunable focus lens.
Figure 5B:
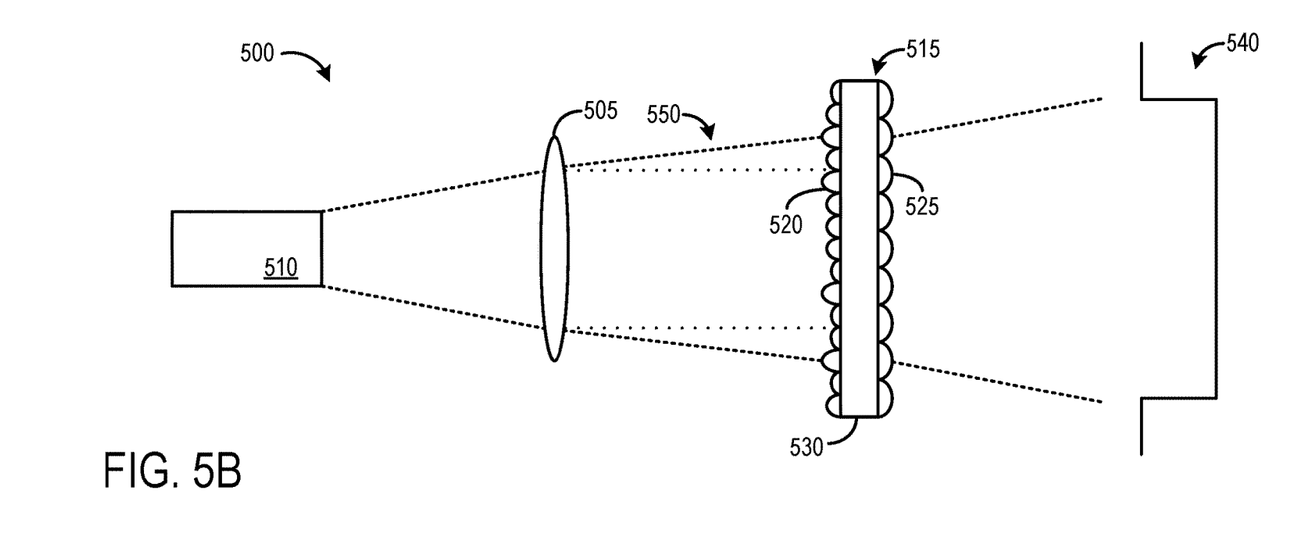

FIGS. 5A and 5B show one example of an optical projector 500 including a tunable focus lens 505. Optical projector 500 further includes illumination source 510, which may be any suitable light producing element, such as a laser diode. Illumination source 510 may emit uncollimated light towards tunable focus lens 505. Optical projector 500 further includes pattern generating optical element 515, which includes a non-periodic light shaping element 520 on a first side, a periodic grating 525 on a second side, opposite the first side and a substrate 530 situated between non-periodic light shaping element 520 and periodic grating 525. As per pattern generating optical element 225, pattern generating optical element 515 may emit patterned light (535) responsive to collimated light being incident on non-periodic light shaping element 520 (FIG. 5A), and may emit non-patterned light (540) responsive to diffuse or uncollimated light being incident on non-periodic light shaping element 520 (FIG. 5B).

Tunable focus lens 505 may be a liquid lens, liquid crystal lens, polymer membrane lens, or any other suitable lens that is electrically actuatable between two or more focus settings. Tunable focus lens 505 is positioned optically between illumination source 510 and pattern generating optical element 515, and thus may be configured to selectively adjust a divergence of a light beam incident on pattern generating optical element 515. As shown in FIG. 5A, tunable focus lens 505 may be actuatable to a first state wherein collimated light (545) is emitted from tunable focus lens 505 and is incident on non-periodic light shaping element 520. Patterned light 535 is thus emitted from pattern generating optical element 515.

As shown in FIG. 5B, tunable focus lens 505 may be actuatable to a second state wherein uncollimated light (550) is emitted from tunable focus lens 505 and is incident on non-periodic light shaping element 520. Non-patterned light 540 is thus emitted from pattern generating optical element 515. Depending on the relative positioning of illumination source 510, tunable focus lens 505, and pattern generating optical element 515, tunable focus lens may be in a properly focused conformation or slightly unfocused conformation in the first state (FIG. 5A), and may be in an unfocused conformation when in the second state (FIG. 5B). Changing the focus of tunable focus lens 505 thus changes the collimation of the input light beam to pattern generating optical element 515, thereby generating (first state) or destroying (second state) the line pattern.

Figure 6A:
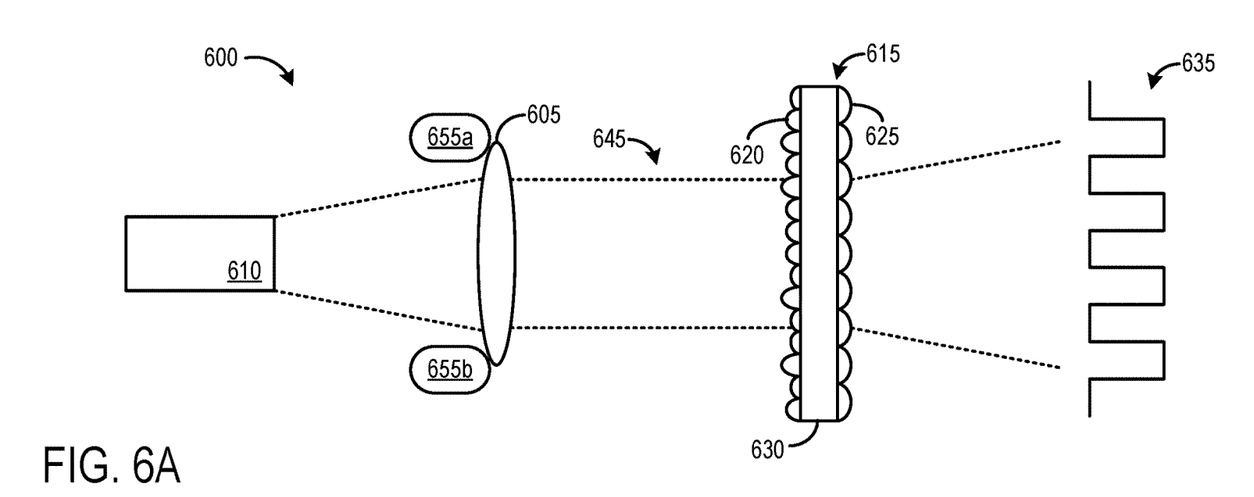
FIGS. 6A and 6B schematically show an example optical projector including a mechanically actuatable lens.
Figure 6B:
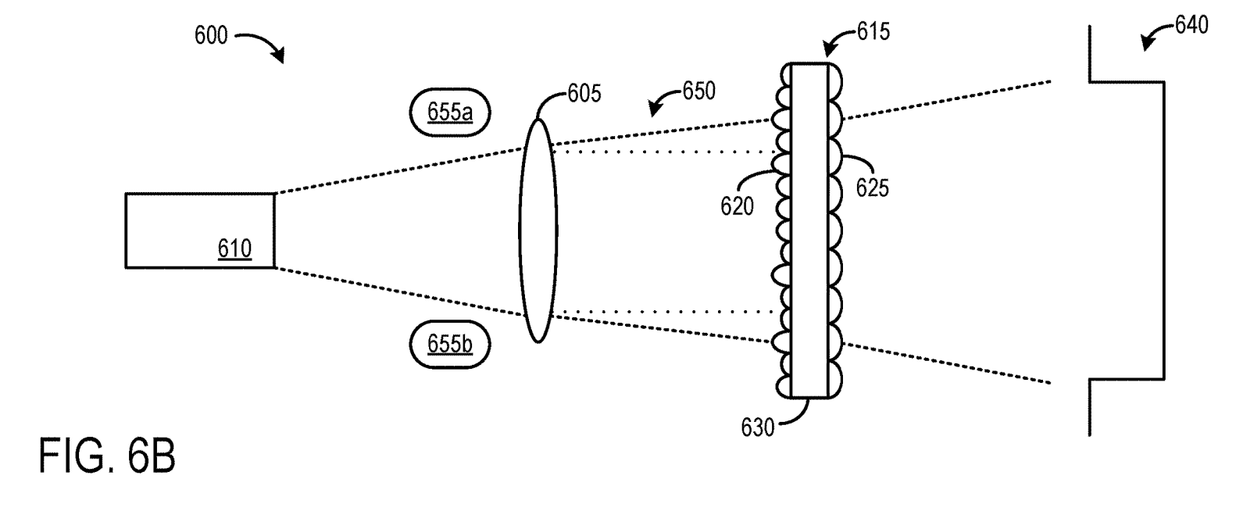

FIGS. 6A and 6B show an example of an optical projector 600 including a mechanically actuatable lens 605. Optical projector 600 further includes illumination source 610, which may be any suitable light producing element, such as a laser diode. Illumination source 610 may emit uncollimated light towards mechanically actuatable lens 605. Optical projector 600 further includes pattern generating optical element 615, which includes a non-periodic light shaping element 620 on a first side, a periodic grating 625 on a second side, opposite the first side, and a substrate 630 situated between non-periodic light shaping element 620 and periodic grating 625. As per pattern generating optical elements 225 and 515, pattern generating optical element 615 may emit patterned light (635) responsive to collimated light being incident on non-periodic light shaping element 620 (FIG. 6A), and may emit non-patterned light (640) responsive to uncollimated light being incident on non-periodic light shaping element 620 (FIG. 6B).

Mechanically actuatable lens 605 is positioned optically between illumination source 610 and pattern generating optical element 615, and thus may be configured to selectively adjust a divergence of a light beam incident on pattern generating optical element 615. Mechanically actuatable lens 605 may be configured to move relative to illumination source 610 and pattern generating optical element 615. By adjusting a positioning of mechanically actuatable lens 605 relative to illumination source 610, the collimation of light emitted by mechanically actuatable lens 605 may change, in a fashion akin to that of an auto-focus lens.

As shown in FIG. 6A, mechanically actuatable lens 605 may be actuatable to a first state wherein collimated light (645) is emitted from mechanically actuatable lens 605 and is incident on non-periodic light shaping element 620. Patterned light 635 is thus emitted from pattern generating optical element 615. As shown in FIG. 6B, mechanically actuatable lens 605 may be actuatable to a second state wherein uncollimated light (650) is emitted from mechanically actuatable lens 605 and is incident on non-periodic light shaping element 620. Non-patterned light 640 is thus emitted from pattern generating optical element 615.

One or more mechanical stopping elements (655a, 655b) may be configured to restrict movement of mechanically actuatable lens 605 at a predetermined distance from illumination source 610. For example, as shown in FIG. 5A, mechanical stopping elements 655a and 655b may define a position for mechanically actuatable lens 605 relative to illumination source 610 whereat collimated light 645 is emitted from mechanically actuatable lens 605. Mechanically actuatable lens 605 may then be moved at predetermined distance from the mechanical stopping elements 655a and 655b so that uncollimated light 650 is emitted from mechanically actuatable lens 605 (see FIG. 6B). Although the example of FIGS. 6A-6B indicate that mechanically actuatable lens 605 is moved further away from illumination source 610 in order to generate uncollimated light 650, in other examples, mechanically actuatable lens 605 may be moved closer to illumination source 610 in order to generate uncollimated light 650. By restricting movement of mechanically actuatable lens 605 in this way, collimated light may be generated without relying on complex feedback mechanisms to satisfy any repeatability requirements of the system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
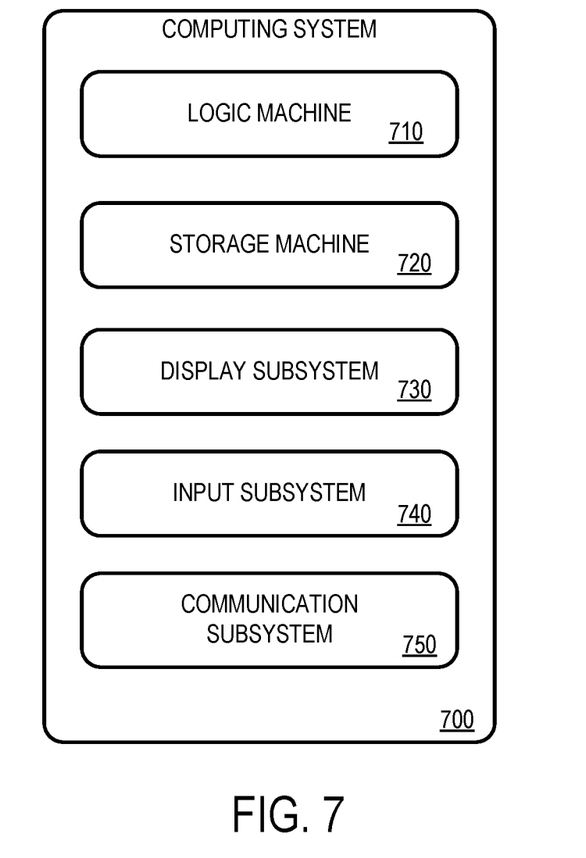
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, an optical projector, comprises a light source; a pattern generating optical element; and a variable optical element positioned optically between the light source and the pattern generating optical element, the variable optical element configured to adjust a divergence of a light beam incident on the pattern generating optical element, and wherein the pattern generating optical element is configured to emit non-patterned light when the variable optical element is in a first state, and to emit patterned light when the variable optical element is in a second state. In such an example, or any other example, the light source may additionally or alternatively be a collimated light source. In any of the preceding examples, or any other example, the variable optical element may additionally or alternatively comprise a switchable diffuser. In any of the preceding examples, or any other example, the switchable diffuser may additionally or alternatively include a diffractive element positioned on a surface of a substrate layer. In any of the preceding examples, or any other example, the diffractive element may additionally or alternatively be encapsulated in a liquid crystal layer. In any of the preceding examples, or any other example, the optical projector may additionally or alternatively comprise a controller configured to apply differing voltages to the liquid crystal layer during the first and second states. In any of the preceding examples, or any other example, a refractive index of the liquid crystal layer may additionally or alternatively match a refractive index of the substrate during the second state. In any of the preceding examples, or any other example, a refractive index of the liquid crystal layer may additionally or alternatively differ from the refractive index of the substrate during the first state. In any of the preceding examples, or any other example, the diffractive element may additionally or alternatively comprise a polymeric material. In any of the preceding examples, or any other example, the pattern generating optical element may additionally or alternatively include a single-sided pattern generator. In any of the preceding examples, or any other example, the single-sided pattern generator may additionally or alternatively be positioned on a surface of the substrate layer. In any of the preceding examples, or any other example, the pattern generating optical element may additionally or alternatively include a double-sided pattern generator. In any of the preceding examples, or any other example, the double-sided pattern generator may additionally or alternatively include a non-periodic light shaping element on a first side, and a periodic grating on a second side, opposite the first side. In any of the preceding examples, or any other example, the optical projector may additionally or alternatively comprise one or more collimating optical elements positioned optically between the variable optical element and the pattern generating optical element.

In another example, a method for operating an optical projector, comprises: during a first condition, directing collimated light through a switchable diffuser such that uncollimated light exits the switchable diffuser so as to be incident on a pattern generating optical element; and during a second condition, directing collimated light through the switchable diffuser such that collimated light exits the switchable diffuser so as to be incident on the pattern generating optical element. In such an example, or any other example, the switchable diffuser may additionally or alternatively include a diffractive element positioned on a surface of a substrate layer, the diffractive element being encapsulated in a liquid crystal layer, and wherein the method comprises adjusting a refractive index of the liquid crystal layer between the first condition and the second condition. In any of the preceding examples, or any other example, adjusting the refractive index of the liquid crystal layer may additionally or alternatively include applying differing voltages to the liquid crystal layer during the first and second conditions.

In yet another example, an optical projector, comprises a light source; a pattern generating optical element; an actuatable lens positioned optically between the laser light source and the pattern generating optical element, the actuatable lens configured to adjust a divergence of a light beam incident on the pattern generating optical element; and a controller configured to selectively adjust a conformation of the actuatable lens between a first state and a second state, such that the pattern generating optical element emits patterned light when the actuatable lens is in a first state, and emits non-patterned light when the actuatable lens is in a second state. In such an example, or any other example, the actuatable lens may additionally or alternatively be a tunable focus lens configured to direct collimated light to the pattern generating optical element when in the first state, and to direct uncollimated light to the pattern generating optical element when in the second state. In any of the preceding examples, or any other example, the actuatable lens may additionally or alternatively be a mechanically actuatable lens, and the controller may additionally or alternatively be configured to adjust a position of the mechanically actuatable lens relative to the laser light source such that collimated light is directed to the pattern generating optical element when the mechanically actuatable lens is in the first state, and such that uncollimated light is directed to the pattern generating optical element when the mechanically actuatable lens is in the second state.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical projector, comprising:
   a light source;
   a pattern generating optical element configured to shape collimated light into a fixed output pattern; and
   a variable optical element positioned optically between the light source and the pattern generating optical element, the variable optical element configured to adjust a divergence of a light beam incident on the pattern generating optical element, and wherein the pattern generating optical element is configured to emit non-patterned light when the variable optical element is in a first state that emits diverging light, and to emit patterned light when the variable optical element is in a second state that emits collimated light.

2. The optical projector of claim 1, wherein the light source is a collimated light source.

3. The optical projector of claim 1, wherein the variable optical element comprises a switchable diffuser.

4. The optical projector of claim 3, wherein the switchable diffuser includes a diffractive element positioned on a surface of a substrate layer.

5. The optical projector of claim 4, wherein the diffractive element is encapsulated in a liquid crystal layer.

6. The optical projector of claim 5, further comprising a controller configured to apply differing voltages to the liquid crystal layer during the first and second states.

7. The optical projector of claim 6, wherein a refractive index of the liquid crystal layer matches a refractive index of the substrate during the second state.

8. The optical projector of claim 7, wherein a refractive index of the liquid crystal layer differs from the refractive index of the substrate during the first state.

9. The optical projector of claim 4, wherein the diffractive element comprises a polymeric material.

10. The optical projector of claim 4, wherein the pattern generating optical element includes a single-sided pattern generator.

11. The optical projector of claim 10, wherein the single-sided pattern generator is positioned on a surface of the substrate layer.

12. The optical projector of claim 1, wherein the pattern generating optical element includes a double-sided pattern generator.

13. The optical projector of claim 12, wherein the double-sided pattern generator includes a non-periodic light shaping element on a first side, and a periodic grating on a second side, opposite the first side.

14. The optical projector of claim 1, further comprising one or more collimating optical elements positioned optically between the variable optical element and the pattern generating optical element.

15. A method for operating an optical projector, comprising:
   during a first condition, directing collimated light through a switchable diffuser such that uncollimated light exits the switchable diffuser so as to be incident on a pattern generating optical element, thereby generating non-patterned light; and
   during a second condition, directing collimated light through the switchable diffuser such that collimated light exits the switchable diffuser so as to be incident on the pattern generating optical element; thereby generating patterned light in a fixed pattern.

16. The method of claim 15, wherein the switchable diffuser includes a diffractive element positioned on a surface of a substrate layer, the diffractive element being encapsulated in a liquid crystal layer, and wherein the method comprises adjusting a refractive index of the liquid crystal layer between the first condition and the second condition.

17. The method of claim 16, wherein adjusting the refractive index of the liquid crystal layer includes applying differing voltages to the liquid crystal layer during the first and second conditions.

18. An optical projector, comprising:
   a light source;
   a pattern generating optical element;
   an actuatable lens positioned optically between the laser light source and the pattern generating optical element, the actuatable lens configured to adjust a divergence of a light beam incident on the pattern generating optical element; and a controller configured to selectively adjust a conformation of the actuatable lens between a first state and a second state, such that the pattern generating optical element emits patterned light when the actuatable lens is in a first state, and emits non-patterned light when the actuatable lens is in a second state.

19. The optical projector of claim 18, wherein the actuatable lens is a tunable focus lens configured to direct collimated light to the pattern generating optical element when in the first state, and to direct uncollimated light to the pattern generating optical element when in the second state.

20. The optical projector of claim 18, wherein the actuatable lens is a mechanically actuatable lens, and wherein the controller is configured to adjust a position of the mechanically actuatable lens relative to the laser light source such that collimated light is directed to the pattern generating optical element when the mechanically actuatable lens is in the first state, and such that uncollimated light is directed to the pattern generating optical element when the mechanically actuatable lens is in the second state.

* * * * *